United States Patent
Hasegawa et al.

(10) Patent No.: US 9,280,002 B2
(45) Date of Patent: Mar. 8, 2016

(54) THIN FILM AND NANOCRYSTALS OF EUROPIUM(II) COMPOUND DOPED WITH METAL IONS

(75) Inventors: Yasuchika Hasegawa, Sapporo (JP); Masashi Maeda, Sapporo (JP); Mina Kumagai, Sapporo (JP); Koji Fushimi, Sapporo (JP)

(73) Assignee: NATIONAL UNIVERSITY CORPORATION HOKKAIDO UNIVERSITY, Sapporo-shi (JP)

( * ) Notice: Subject to any disclaimer, the term of this patent is extended or adjusted under 35 U.S.C. 154(b) by 212 days.

(21) Appl. No.: 14/002,895

(22) PCT Filed: Mar. 1, 2012

(86) PCT No.: PCT/JP2012/055264
§ 371 (c)(1),
(2), (4) Date: Nov. 20, 2013

(87) PCT Pub. No.: WO2012/121112
PCT Pub. Date: Sep. 13, 2012

(65) Prior Publication Data
US 2014/0071527 A1    Mar. 13, 2014

(30) Foreign Application Priority Data

Mar. 4, 2011 (JP) ................................. 2011-047623

(51) Int. Cl.
*G02F 1/00* (2006.01)
*G02F 1/09* (2006.01)
*B82Y 20/00* (2011.01)
*B82Y 30/00* (2011.01)
*B82Y 40/00* (2011.01)
(Continued)

(52) U.S. Cl.
CPC ............... *G02F 1/0036* (2013.01); *B82Y 20/00* (2013.01); *B82Y 30/00* (2013.01); *B82Y 40/00* (2013.01);
(Continued)

(58) Field of Classification Search
CPC ....... G02F 1/0036; G02F 1/093; B82Y 20/00; B82Y 30/00; B82Y 40/00; C01B 19/007; C01F 17/0043; C01F 17/0087; C01P 2002/54; C01P 2002/72; C01P 2004/04; C01P 2004/51; C01P 2004/64; C01P 2002/84; C01P 2006/42; Y10S 977/773; Y10S 977/896; Y10S 977/902
USPC ............... 359/324, 484.03; 428/32.74, 846.2; 977/778, 779, 810, 834, 900
See application file for complete search history.

(56) References Cited

U.S. PATENT DOCUMENTS

| | | | |
|---|---|---|---|
| 7,993,541 B1 * | 8/2011 | Bhargava et al. | ...... 252/62.51 R |
| 2003/0161777 A1 | 8/2003 | Yanagida et al. | |
| 2009/0015919 A1 | 1/2009 | Hasegawa et al. | |

FOREIGN PATENT DOCUMENTS

| | | |
|---|---|---|
| JP | 2001-354417 A | 12/2001 |
| JP | 2004-354927 A | 12/2004 |

(Continued)

OTHER PUBLICATIONS

International Search Report with a mailing date of May 29, 2012 for counterpart International Application No. PCT/JP2012/055264.

(Continued)

*Primary Examiner* — Frank Font
(74) *Attorney, Agent, or Firm* — Sughrue Mion, PLLC

(57) ABSTRACT

The present invention relates to Eu (II) compound nanocrystals doped with transition metal ions. Such a constitution generates quantum size effects of an Eu (II) compound nanoparticle, while the transition metal ions can affect a magnetooptical property of the Eu (II) compound nanoparticle. Thus, the magnetooptical property can be improved.

10 Claims, 20 Drawing Sheets

(51) Int. Cl.
*C01B 19/00* (2006.01)
*C01F 17/00* (2006.01)

(52) U.S. Cl.
CPC .......... *C01B 19/007* (2013.01); *C01F 17/0043* (2013.01); *C01F 17/0087* (2013.01); *G02F 1/093* (2013.01); *C01P 2002/54* (2013.01); *C01P 2002/72* (2013.01); *C01P 2002/84* (2013.01); *C01P 2004/04* (2013.01); *C01P 2004/51* (2013.01); *C01P 2004/64* (2013.01); *C01P 2006/42* (2013.01); *Y10S 977/773* (2013.01); *Y10S 977/896* (2013.01); *Y10S 977/902* (2013.01)

(56) References Cited

FOREIGN PATENT DOCUMENTS

| | | |
|---|---|---|
| JP | 2008-268862 A | 11/2008 |
| WO | 2007/102271 A1 | 9/2007 |

OTHER PUBLICATIONS

English translation of the International Preliminary Report on Patentability and Written Opinion of the International Searching Authority mailed Sep. 6, 2013 for counterpart International Application No. PCT/JP2012/055263.

Hiroki Nakao et al.; "EuS-Au Fukugo Nano Ryushi no Gosei Oyobi Hikari Jiki Tokusei no Hyoka"; CSJ: The Chemical Society of Japan Koen Yokoshu; vol. 90th; No. 3, Mar. 12, 2010; p. 921; 2 PC-012.

Masashi Maeda et al.; "Hikari Jiki Tokusei o Yusuru EuS Nano Kessho eno Sen'i Kinzoku Dope (Doping of transition metals in EuS nanocrystals having magneto-optical properties)"; 2011 Nen Symposium on Photochemistry; Sep. 1, 2011; p. 51; 1P116.

T. R. McGuire et al.; "Magnetic and Magneto-Optical Properties of Fe-Doped EuO Films"; Journal of Applied Physics; vol. 42, No. 4; Mar. 15, 1971; pp. 1775-1777.

Srotoswini Kar et al.; "Gadolinium Doped Europium Sulfide"; J. Am. Chem. Soc.; vol. 132, No. 40; 2010; pp. 13960-13962.

* cited by examiner

Fig.10

| EuS | Eu (420.505nm) | Mn (260.569nm) |
|---|---|---|
| Intensity | 74215.78 | 15.37907 |
| Concentration [$\mu$ mol/l] | 6.91 | $-3.64 \times 10^{-3}$ |

| EuS:Mn | Eu (420.505nm) | Mn (260.569nm) |
|---|---|---|
| Intensity | 25079.68 | 2231.723 |
| Concentration [$\mu$ mol/l] | 2.43 | 1.04 |

THIN FILM AND NANOCRYSTALS OF EUROPIUM(II) COMPOUND DOPED WITH METAL IONS

CROSS REFERENCE TO RELATED APPLICATIONS

This application is a National Stage of International Application No. PCT/JP2012/055264, filed on Mar. 1, 2012, which claims priority from Japanese Patent Application No. 2011-047623, filed on Mar. 4, 2011, the contents of all of which are incorporated herein by reference in their entirety.

TECHNICAL FIELD

Various aspects and embodiments of the present invention relate to nanocrystals and a thin film of an Eu (II) compound doped with metal ions.

Conventionally, high-speed communication with large capacity has been achieved by attaching a micro-optical isolator to a semiconductor laser. As a material for the micro-optical isolator corresponding to optical communication wavebands (1.3 μm, 1.55 μm), a Bi-substituted garnet is known (for example, see Patent Document 1). In Patent Document 1, composite film is produced by containing nanoparticles of Au, Al, Ag or the like within Bi-substituted garnet thin film, thus electric polarization induced by the metal nanoparticles is increased by surface plasmon resonance of the metal nanoparticles, and thereby magnetooptic effects of the Bi-substituted garnet are increased.

Meanwhile, in relation to the Eu (II) compound (Europium chalcogenide) represented by EuO, since Eu (II) having 7 unpaired f electrons shows intense light absorption and light emission resulting from f-d transition as well as ferromagnetic property, the compound has received attention for its magnetooptical property and is expected to be available as an optical isolator material. Among the properties, particularly the Faraday effect that a polarization plane is rotated by applying a magnetic field has been the focus of attention (for example, see Patent Documents 2 and 3). Patent Documents 2 and 3 suggest that nanocrystals of EuO express magnetooptical properties by quantum size effects at room temperature.

CITATION LIST

Patent Literature

Patent Document 1: Japanese Patent Application Laid-Open No. 2008-268862
Patent Document 2: Japanese Patent Application Laid-Open No. 2001-354417
Patent Document 3: Japanese Patent Application Laid-Open No. 2004-354927

SUMMARY OF INVENTION

Technical Problem

Development of a novel material having a magnetooptical property better than ever before is important for downsizing of optical isolators. An object of the present invention is to provide a material having an improved magnetooptical property.

Solution to Problem

As a result of further diligent studies for solving the problems, the inventors found that the Faraday effect of the Eu (II) compound is considerably increased by doping the Eu (II) compound with transition metal ions.

That is, the nanocrystal related to one aspect of the present invention is the nanocrystal of the Eu (II) compound doped with transition metal ions. Such a constitution generates quantum size effects of an Eu (II) compound nanoparticle, while the transition metal ions can affect a magnetooptical property of the Eu (II) compound nanoparticle. Thus, the magnetooptical property can be improved.

In one embodiment, the Eu (II) compound nanoparticle may be made of a material selected from EuO, EuS, EuSe or EuTe. In addition, the ions are Mn, Fe or Co ions and may be coated with a film containing Mn, Fe or Co.

In addition, a thin film related to another aspect of the present invention is a thin film of an Eu (II) compound doped with the transition metal ions. The thus constituted thin film generates the same actions and effects as the nanocrystal.

In addition, a magnetooptical material related to another aspect of the present invention is produced by using the nanocrystal or the thin film. Since the Eu (II) compound nanoparticle has a feature of change in magnetic susceptibility by light irradiation, for example, adoption of the composite nanocrystal or the composite thin film for a Faraday rotator allows for provision of an optical device impractical in conventional technologies like an optical isolator in which a polarization plane can be rotated corresponding to light.

In addition, an inorganic glass or polymeric thin film related to another aspect of the present invention is produced by using the composite nanocrystal or the composite thin film. Thereby, a magnetooptical material such as a novel optical isolator and a recording medium can be provided.

In addition, an optical isolator related to another aspect of the present invention is equipped with a Faraday rotator produced by using the nanocrystal, the thin film, the magnetooptical material or the inorganic glass thin film. Such a constitution can give the same polarization rotation effect as an optical isolator equipped with a Faraday rotator made of garnet crystal.

In addition, a manufacturing method of the nanocrystal related to another aspect of the present invention comprises a step of dispersing a complex containing Eu (III) and a complex containing a transition metal in a solvent, and a step of synthesizing an Eu (II) compound nanocrystal doped with the transition metal ions by thermal reduction of the solvent.

According to the aforementioned manufacturing method of the nanocrystal, the Eu (II) compound nanocrystal doped with the transition metal ions can be synthesized by mixing of the complex containing Eu (III) and the complex containing the transition metal and by simultaneous thermal reduction of them.

Furthermore, a manufacturing method of a thin film related to another aspect of the present invention is a manufacturing method for electrochemically manufacturing the thin film, and comprises a step of dispersing the complex containing Eu (III) and the complex containing a transition metal in a solvent, and a step of applying a voltage by inserting a transparent electrode as a work electrode into the solvent to produce a thin film composed of the Eu (II) compound doped with the transition metal ions on the transparent electrode.

According to the aforementioned manufacturing method of the thin film, a thin film can be produced by electrochemical actions.

Advantageous Effects of Invention

Faraday effects of the Eu (II) compound can be considerably increased by doping with the transition metal ions.

BRIEF DESCRIPTION OF DRAWINGS

FIG. 10 represents results of ICP emission spectrometry.

DESCRIPTION OF EMBODIMENTS

Hereinafter, embodiments of the present invention will be explained with reference to accompanying drawings. In the description of the drawings, the same members have the same number symbols, and redundant explanations are eliminated. In addition, magnifications in the Figures do not necessarily coincide with those in the description.

(Nanocrystal)

The nanocrystal related to the embodiment of the present invention is a crystalline Eu (II) compound nanocrystal doped with metal ions. An average particle size of the Eu (II) compound nanoparticle doped with the metal ions is, for example, about 5 nm to 100 nm. As a material of the Eu (II) compound nanoparticle, an europium chalcogenide of, for example, EuO, EuS, EuSe or EuTe is used. As a material of the metal ion, a transition metal is used. For example, Mn, Cr, Fe, Co, Ni, Cu, Ag, Zn, Cd, or their combination is used. In addition, a concentration of the metal ion may be within about 0.1% to 49% by mass. Furthermore, the Eu (II) compound nanoparticle doped with metal ions may be coated with the transition metal.

When the nanocrystal is irradiated with light, the transition metal ions doping the nanocrystal affect a magnetooptical property of the Eu (II) compound nanoparticle. As a result, the magnetooptic effects of the Eu (II) compound nanoparticle itself can be increased. In addition, the Eu (II) compound is used as a nanoparticle, thereby the Faraday effect across a wide region from ultraviolet to infrared can be shown at room temperature due to the quantum size effect. Thus, the compound can be used as an optical element or the like corresponding to a wide range of wavelengths.

(Manufacturing Method of the Nanocrystal)

A manufacturing method of the nanocrystal related to the embodiment will be explained with reference to FIG. 1. Hereinafter, a case using EuS (europium sulfide) as an Eu (II) compound and Mn as a metal will be explained from the viewpoint of easiness of understanding of the explanation.

First, an Eu (III) carbamide complex as a synthetic raw material of the EuS nanocrystal: [Eu (PPh$_4$) (S$_2$CNEt$_2$)] and a complex for doping with Mn: [Mn (S$_2$CNEEt$_2$)$_3$)] are prepared.

Figure 1:
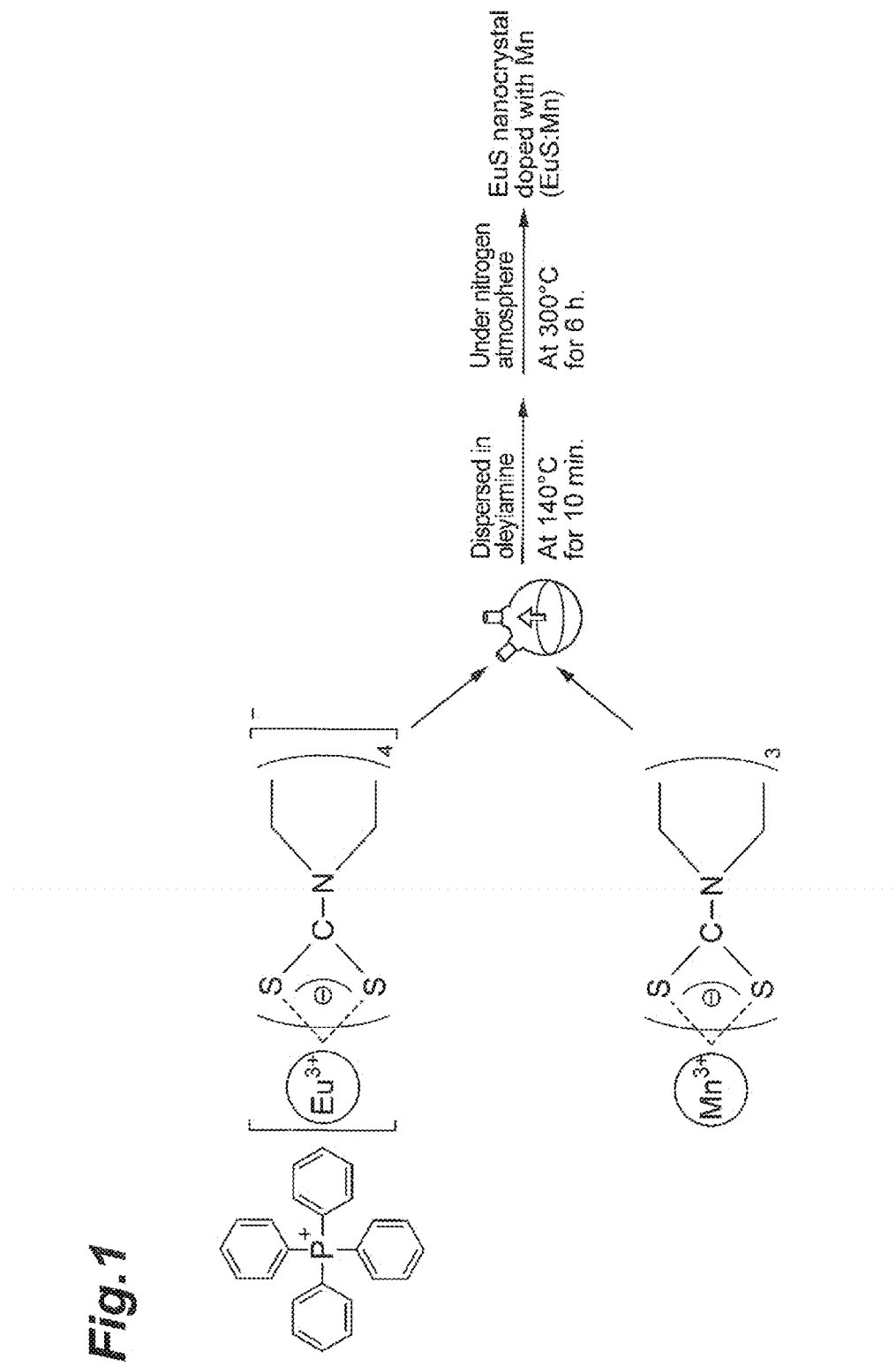
FIG. 1 represents a schematic view illustrating a manufacturing step of the EuS nanocrystal doped with Mn.

Next, as shown in FIG. 1, the Eu (III) carbamide complex and the complex for doping with Mn are dispersed in a solvent. As the solvent, for example, oleylamine is used. Subsequently, the resulting solution is heated. As a heat condition, heating is conducted, for example, at 140° C. for 10 minutes. Subsequently, it is further heated at a high temperature under a nitrogen atmosphere. As a heat condition, heating is conducted, for example, at 300° C. for 6 hours. Thus, the EuS nanocrystal doped with Mn (EuS:Mn nanocrystal) can be obtained by thermal reduction.

Structural evaluation of the EuS:Mn nanocrystal obtained in the aforementioned process is shown below. The structure was evaluated by transmission electron microscope (TEM) and X-ray diffraction (XRD), and elemental constituents were evaluated by ICP emission spectrometry (CIP: Atomic Emission Spectrometer). In addition, in order to evaluate the EuS:Mn nanocrystal, an EuS nanocrystal and an MnS nanocrystal were produced to evaluate them together.

Figure 2:
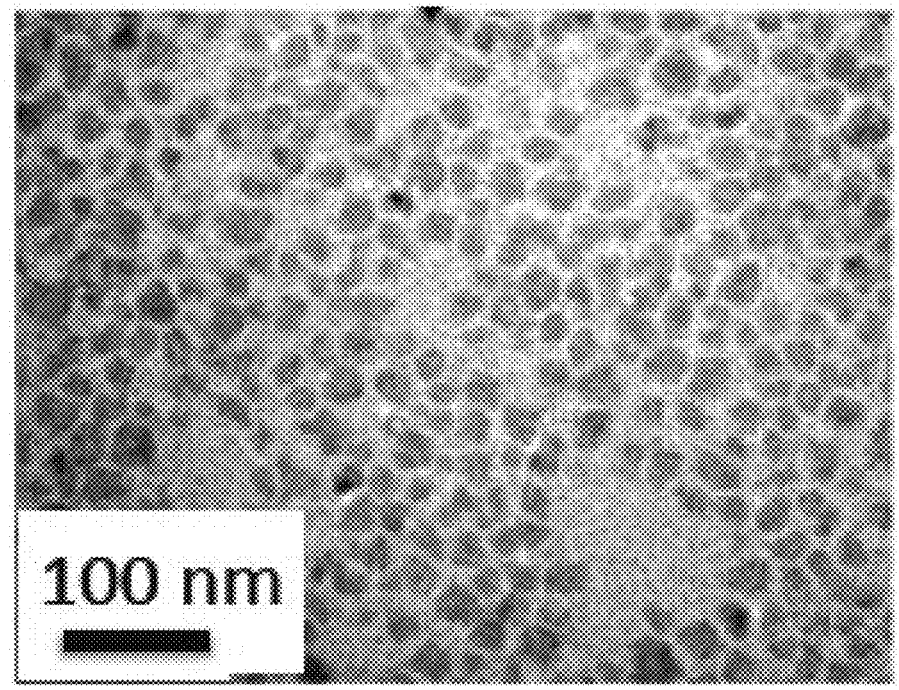
FIG. 2 represents a TEM image of the EuS nanocrystal doped with Mn.
Figure 3:
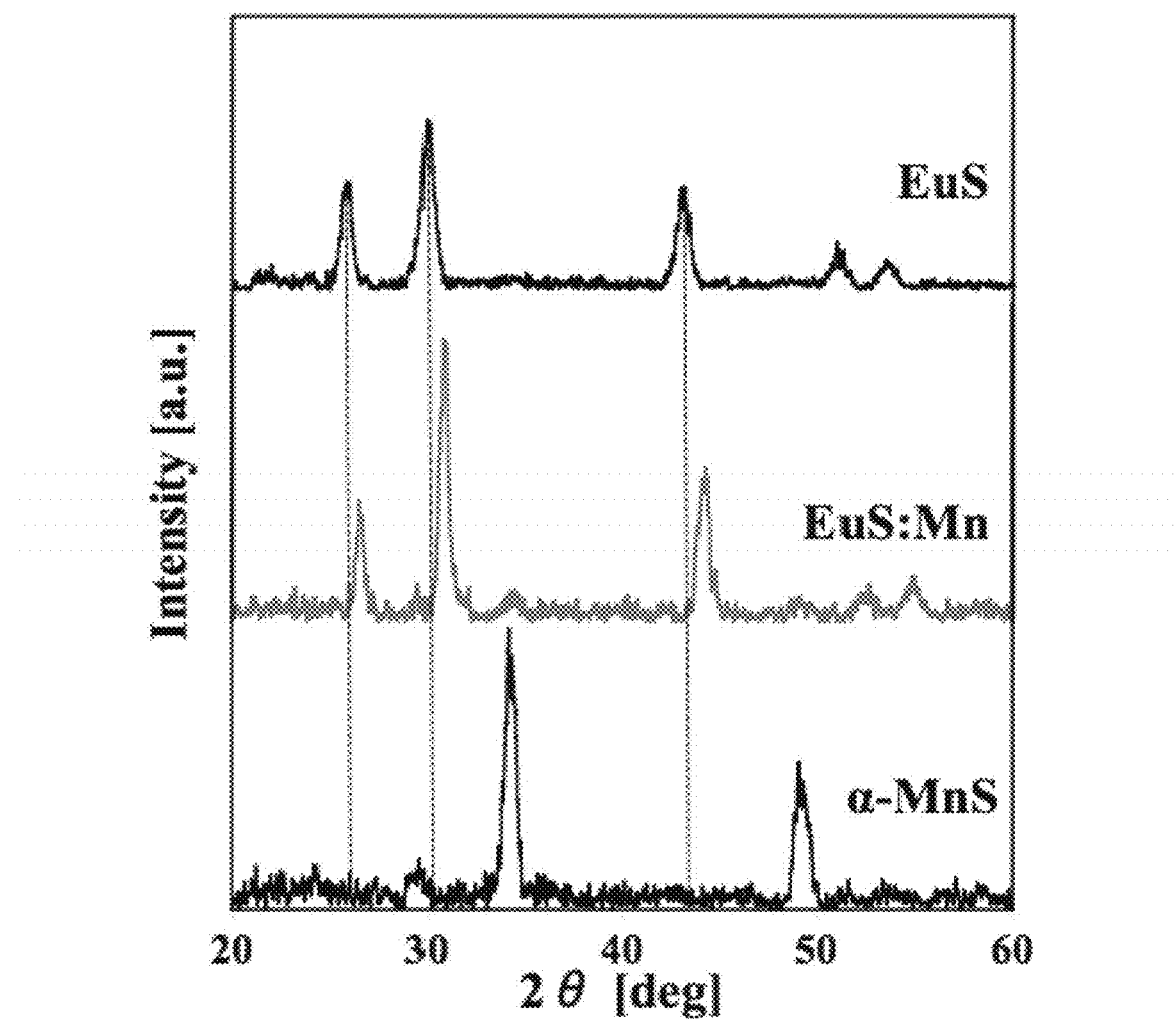
FIG. 3 represents XRD measurement results of the Mn nanocrystal.

FIG. 2 represents a TEM image of the EuS:Mn nanocrystal. As shown in FIG. 2, nanoparticles were produced, and an average particle size of them was confirmed to be about 22.1 nm. FIG. 3 represents XRD measurement results. As shown in FIG. 3, peak shift to a side of high angle was found in relation to all signals derived from the EuS nanocrystal. The peak shift to the side of high angle is considered as reflection of the structure resulting from the Mn doping. In addition, from the results of the XRD measurement, an average particle size calculated by using Scherrer formula was about 11.47 nm and differed from the average particle size in the TEM image.

Figure 4:
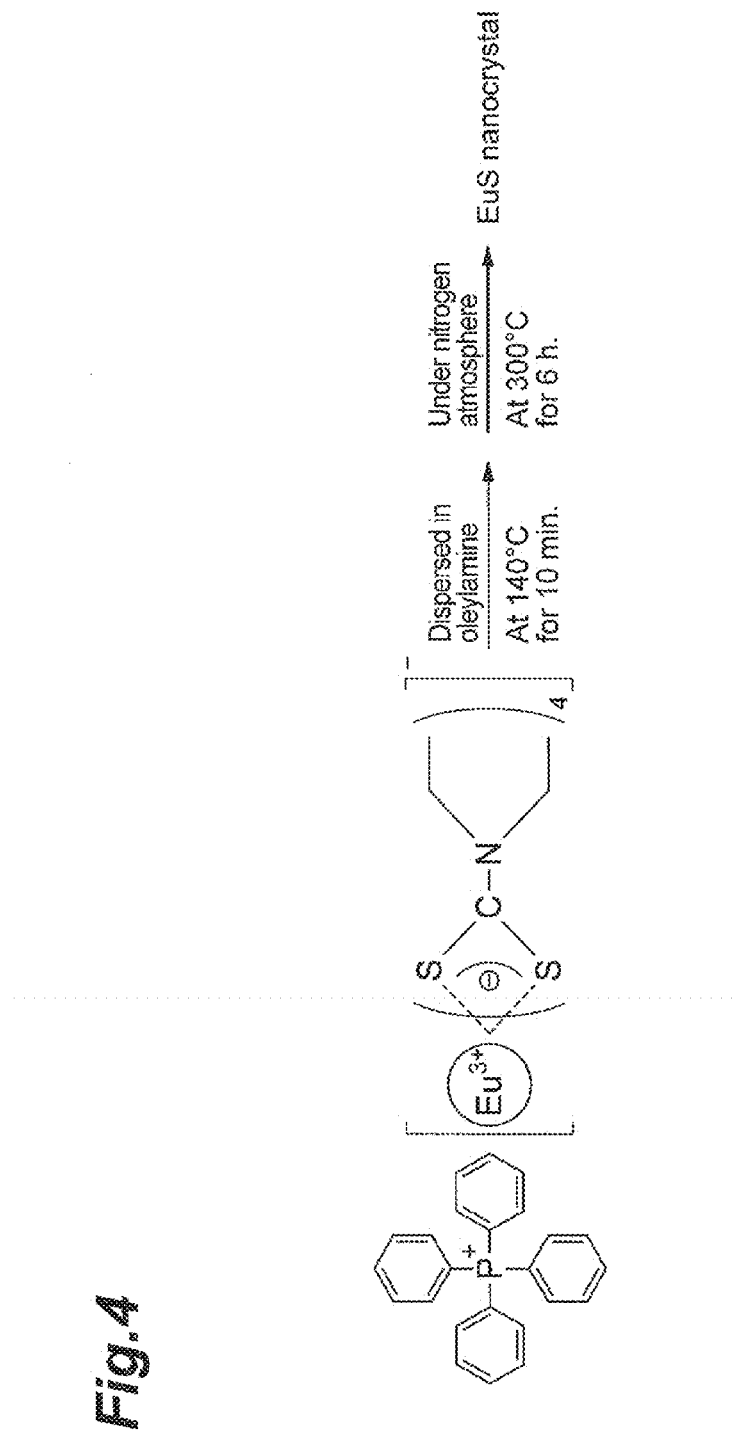
FIG. 4 represents a schematic view illustrating the manufacturing step of the EuS nanocrystal.
Figure 5:
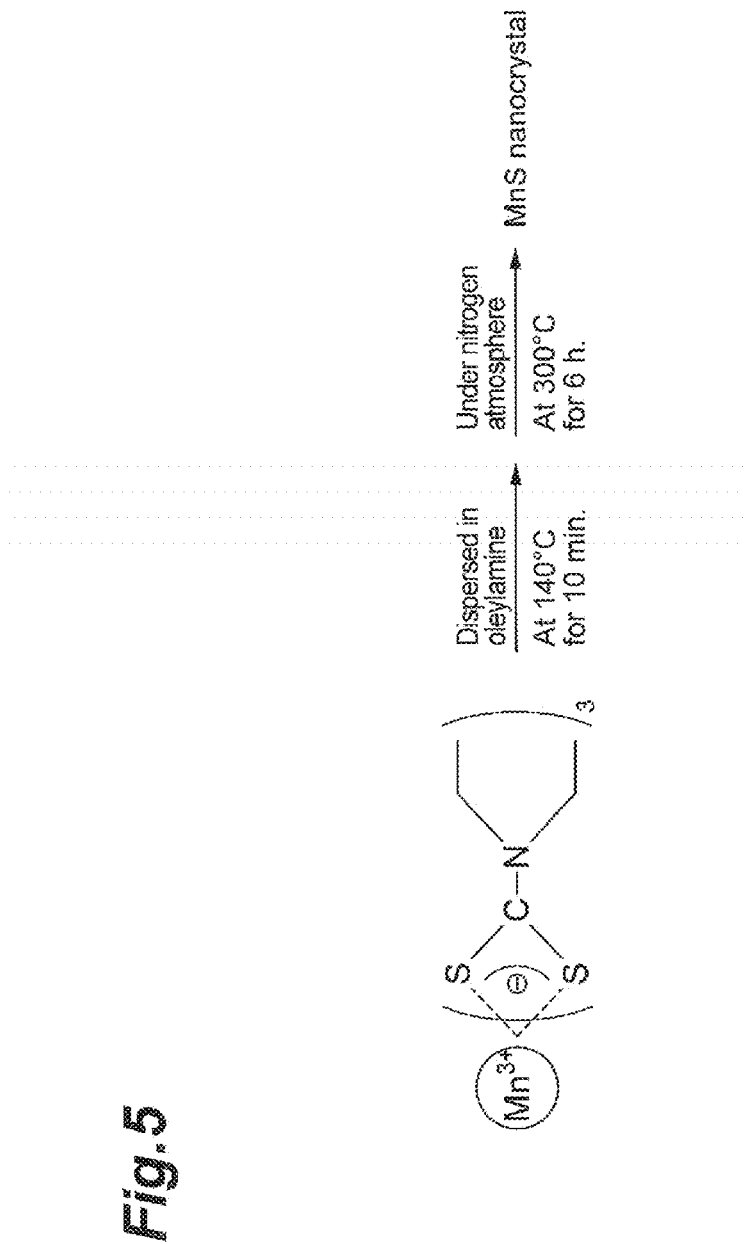
FIG. 5 represents a schematic view illustrating the manufacturing step of the MnS nanocrystal.
Figure 6:
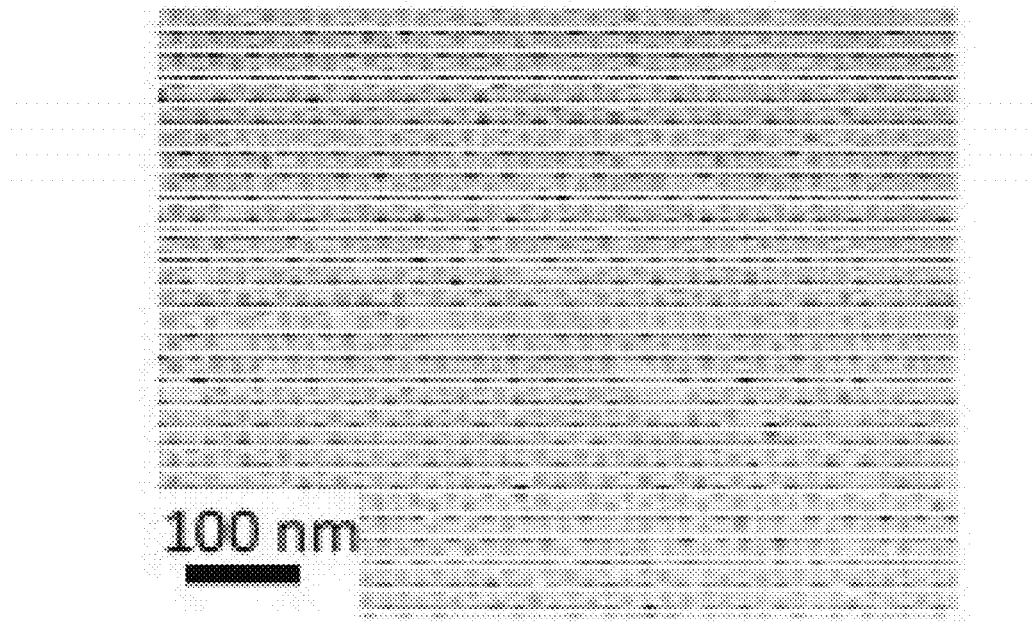
FIG. 6 represents a TEM image of the EuS nanocrystal.

In order to consider the difference, an EuS nanocrystal and an MnS nanocrystal were produced. As shown in FIGS. 4 and 5, the EuS nanocrystal and the MnS nanocrystal were obtained by dispersing a raw material in oleylamine and heating it to reflux under a nitrogen atmosphere. The production conditions were the same as those of the EuS:Mn nanocrystal. FIG. 6 represents a TEM image of the EuS nanocrystal.

Figure 7:
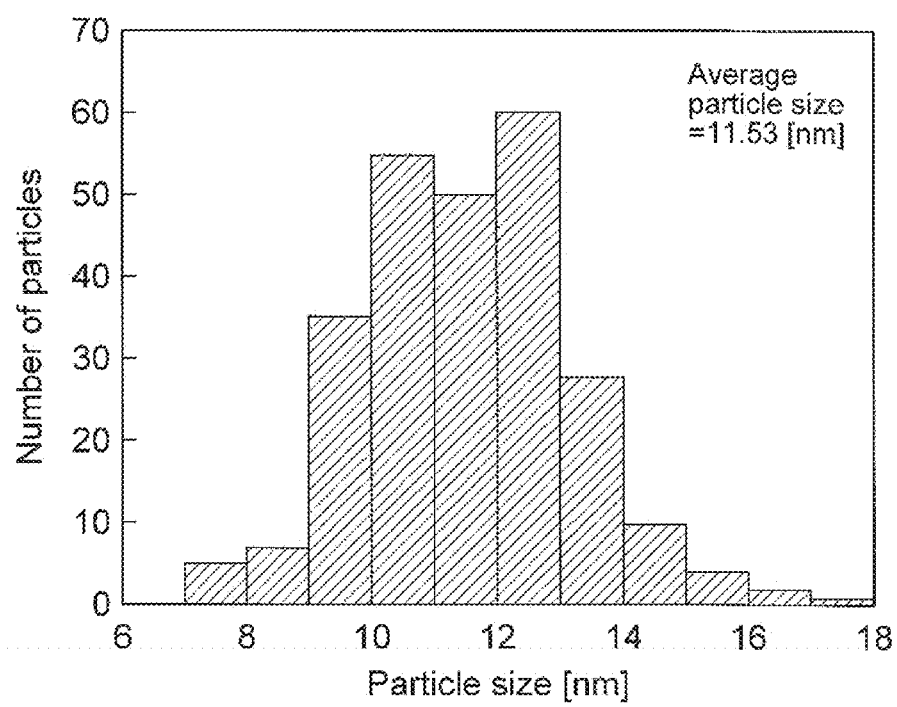
FIG. 7 represents a particle size distribution of the EuS nanocrystal.
Figure 8:
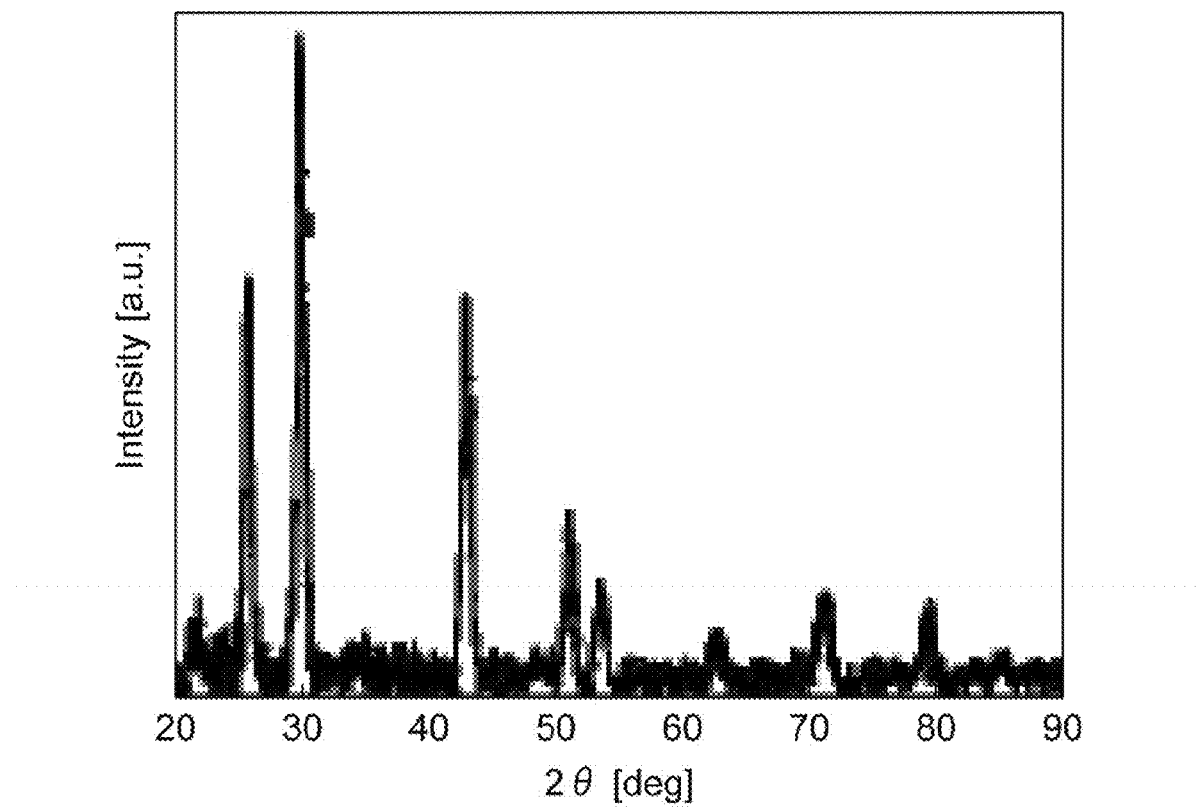
FIG. 8 represents XRD measurement results of the EuS nanocrystal.
Figure 9:
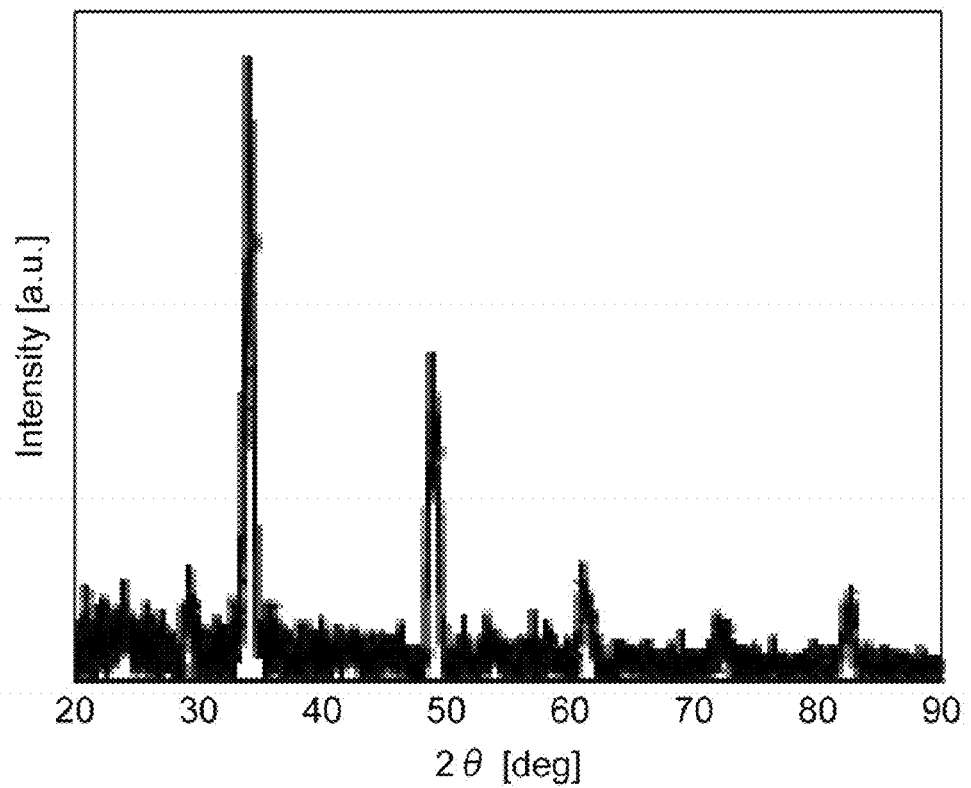
FIG. 9 represents XRD measurement results of the MnS nanocrystal.

As shown in FIG. 6, it was confirmed that the EuS crystal was microparticulated on a nanoscale. In addition, FIG. 7 represents a particle size distribution of the TEM image in FIG. 6, and the horizontal axis represents particle sizes [nm] and the vertical axis represents the number of the particles. As shown in FIG. 7, the average particle size was about 11.53 nm. FIGS. 8 and 9 represent XRD measurement results of the EuS nanocrystal and XRD measurement results of the MnS nanocrystal respectively. As shown in FIGS. 8 and 9, both EuS and MnS had NaCl structures.

FIG. 10 represents measurement results of ICP emission spectrometry. The upper table in this figure represents measurement results of ICP emission spectrometry of the EuS nanocrystal, and the lower table in this figure represents measurement results of ICP emission spectrometry of the EuS:Mn nanocrystal. As shown in FIG. 10, the EuS nanocrystal contains no Mn, and the EuS:Mn nanocrystal contains Mn elements at a concentration of 1.04 [μmol/l] to Eu elements at a concentration of 2.43 [μmol/l].

Figure 11:
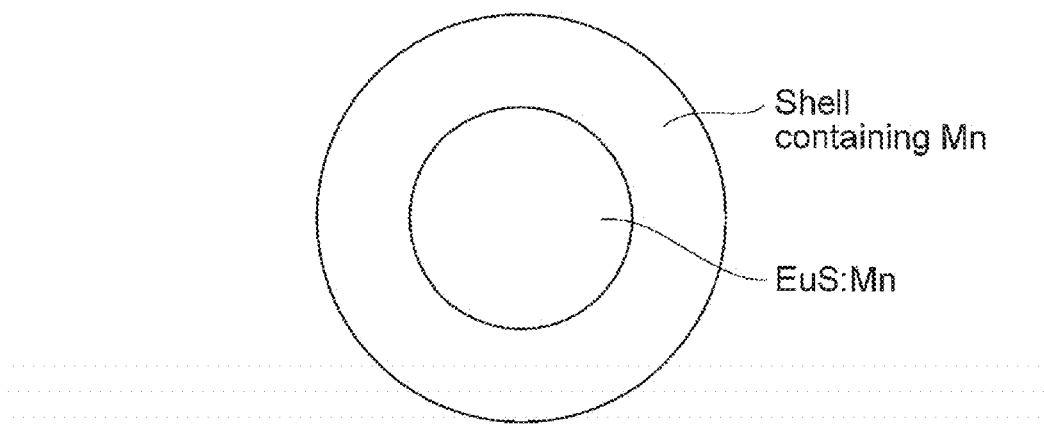
FIG. 11 represents a schematic view illustrating a structure of the EuS nanocrystal doped with Mn.

From the measurement results, it is assumed that the EuS:Mn nanocrystal is constituted as shown in FIG. 11. That is, a structure that the outside of the EuS:Mn particle is coated with an Mn-containing film like a shell can be assumed. The Mn-containing film can be assumed to be about 10.63 nm by subtracting the average particle size of 11.47 nm calculated in XRD measurement from the average particle size of 22.1 nm in the TEM image of the EuS:Mn nanocrystal.

Figure 12:
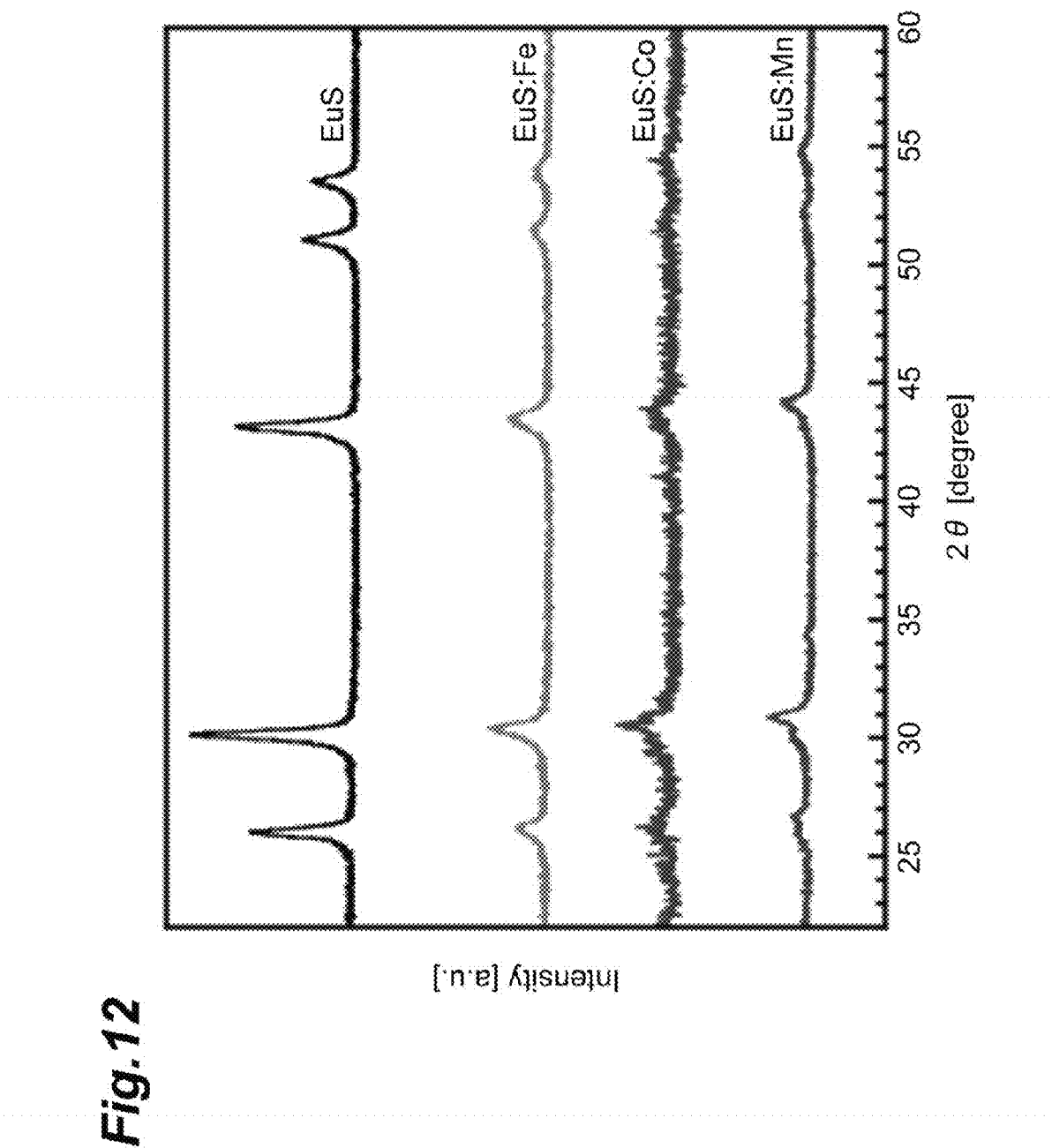
FIG. 12 represents XRD measurement results of the EuS nanocrystal, the EuS nanocrystal doped with Mn, the EuS nanocrystal doped with Fe and the EuS nanocrystal doped with Co.

Consequently, although the case using Mn as a material of the metal ion was explained from the viewpoint of easiness of understanding of the explanation, manufacture is also possible in the same manner even in a case using other transition metals. Hereinafter, a case using Fe and Co will be explained as other examples of transition metals. Similar to the aforementioned case of Mn, an EuS nanocrystal doped with Fe (EuS:Fe nanocrystal) and an EuS nanocrystal doped with Co (EuS:Co nanocrystal) were produced by thermal reduction to evaluate their structures. FIG. 12 represents XRD measurement results of the EuS nanocrystal, the EuS:Mn nanocrystal, as well as the EuS:Fe nanocrystal and the EuS:Co nanocrystal. As shown in FIG. 12, it was confirmed that even in a case of doping with Fe or Co showed the same tendency as in the case of doping with Mn. That is, it was confirmed that the peaks of the EuS:Mn nanocrystal, the EuS:Fe nanocrystal and the EuS:Co nanocrystal shifted to the side of high angle compared to the peak of the EuS nanocrystal alone. Here, lattice constant a was calculated for detailed examination. When a peak position (hkl) is represented by $2\theta_{hkl}$ and a wavelength of the X-ray light source is represented by $\lambda$, lattice constant a can be calculated the following formula.

$$a = \frac{\lambda \cdot (h^2 + k^2 + l^2)^{\frac{1}{2}}}{2 \cdot \sin\theta_{hkl}}$$

Since the X-ray used for the above measurement is Cu-Kα ray ($\lambda$=0.15406 nm), lattice constant a can be calculated from the measurement result. $2\theta_{hkl}$ [°] and lattice constant a [nm] are as shown in the following Table 1.

TABLE 1

| Sample | | (111) | (200) | (220) | (311) | (222) |
|---|---|---|---|---|---|---|
| EuS | $2\theta_{hkl}$ | 26.04° | 30.10° | 43.16° | 51.06° | 53.52° |
| | a | 0.5922 nm | 0.5933 nm | 0.5927 nm | 0.5927 nm | 0.5926 nm |
| EuS:Fe | $2\theta_{hkl}$ | 26.24° | 30.42° | 43.54° | 51.46° | 54.02° |
| | a | 0.5878 nm | 0.5872 nm | 0.5874 nm | 0.5885 nm | 0.5876 nm |
| EuS:Co | $2\theta_{hkl}$ | 26.30° | 30.50° | 43.80° | 51.70° | 54.42° |
| | a | 0.5864 nm | 0.5857 nm | 0.5841 nm | 0.5859 nm | 0.5836 nm |
| EuS:Mn | $2\theta_{hkl}$ | 26.72° | 30.84° | 44.30° | 52.04° | 54.66° |
| | a | 0.5774 nm | 0.5794 nm | 0.5779 nm | 0.5824 nm | 0.5812 nm |

In Table 1, the upper column in each frame represents the scattering angle $2\theta_{hkl}$ of (hkl), and the lower column in each frame represents lattice constant a calculated by using the scattering angle $2\theta_{hkl}$. As shown in Table 1, lattice constant a of the EuS nanocrystal doped with Mn, Fe or Co was smaller than that of the EuS nanocrystal alone. Thus, since lattice constant a varies, the transition metals such as Mn, Fe and Co are assumed to be introduced into the crystal lattice of the EuS nanocrystal. In addition, since ion radii of Mn ion, Fe ion and Co ion are smaller than the ion radius of Eu ion, it is assumed that doping with the transition metal acted so as to reduce lattice constants a.

(Thin Film)

The thin film related to the embodiment of the present invention is a thin film composed of the crystalline Eu (II) compound nanocrystal doped with metal ions. A film thickness is, for example, about 5 nm to 100 μm. An average particle size of the Eu (II) compound nanoparticle doped with metal ions is, for example, about 5 nm to 100 nm. As a material of the Eu (II) compound nanoparticle, an europium chalcogenide of, for example, EuO, EuS, EuSe or EuTe is used. Transition metals are used. For example, Mn, Cr, Fe, Co, Ni, Cu, Ag, Zn, Cd or their combination is used. In addition, a concentration of the metal ion may be within about 0.1% to 49% by mass.

When the aforementioned thin film is irradiated with light, the metal ions doping the nanocrystal affect a magnetooptical property of the Eu (II) compound nanoparticle. As a result, the magnetooptic effects of the Eu (II) compound nanoparticle itself can be increased. In addition, the Eu (II) compound is used as a nanoparticle, thereby the Faraday effect across a wide region from ultraviolet to infrared can be shown at room temperature due to the quantum size effect. Thus, the compound can be used as an optical element or the like corresponding to a wide range of wavelengths.

(Manufacturing Method of the Thin Film)

The manufacturing method of the thin film related to the embodiment will be explained. Hereinafter, a case using EuS (europium sulfide) as an Eu (II) compound and Mn as a metal will be explained from the viewpoint of easiness of understanding of the explanation.

First, an Eu (III) carbamide complex as a synthetic raw material of the EuS nanocrystal: [Eu (PPh$_4$) (S$_2$CNEt$_2$)] and a complex for doping with Mn: [Mn (S$_2$CNEEt$_2$)$_3$)] are prepared.

Next, the Eu (III) carbamide complex, the complex for doping with Mn and a supporting electrolyte are dispersed in a solvent. As the supporting electrolyte, for example, tetrabutylammonium (III) is used. As the solvent, for example, acetonitrile is used.

Figure 13:
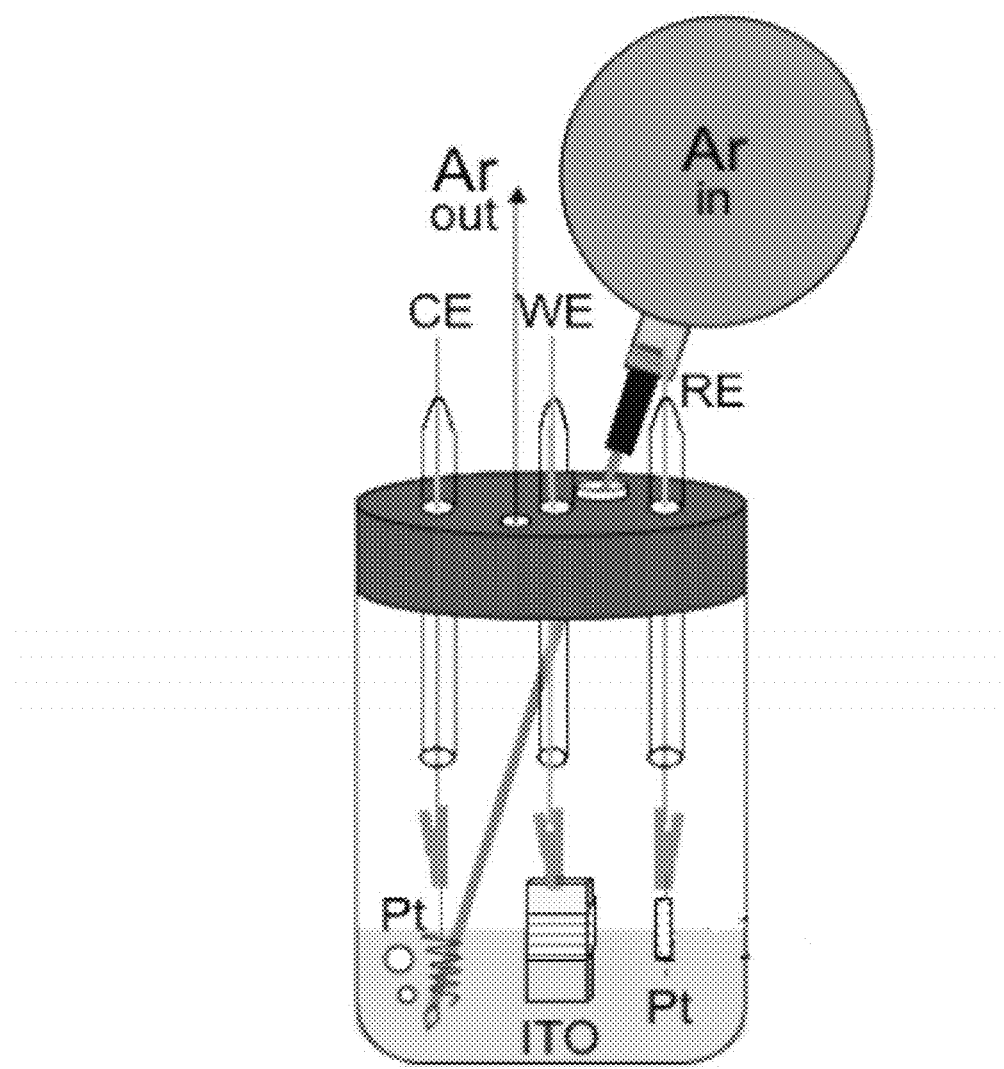
FIG. 13 represents a schematic view illustrating manufacturing equipment of the EuS/Au composite thin film.

Next, a transparent electrode is used as a work electrode WE for electrochemical synthesis of the thin film, and the transparent electrode WE, a reference electrode RE and a counter electrode CE are inserted into the solvent, to which a voltage is applied during degasification by Ar, as shown in FIG. 13. For example, an indium tin oxide (ITO) is used as the transparent electrode, and platinum (Pt) is used for the reference electrode and the counter electrode. The transparent electrode is inserted into the solvent, to which a voltage is applied, resulting in production of a thin film comprising the EuS nanoparticle doped with Mn on the transparent electrode. Thus, the thin film can be electrochemically manufactured.

(Magnetooptical Material)

Figure 14:
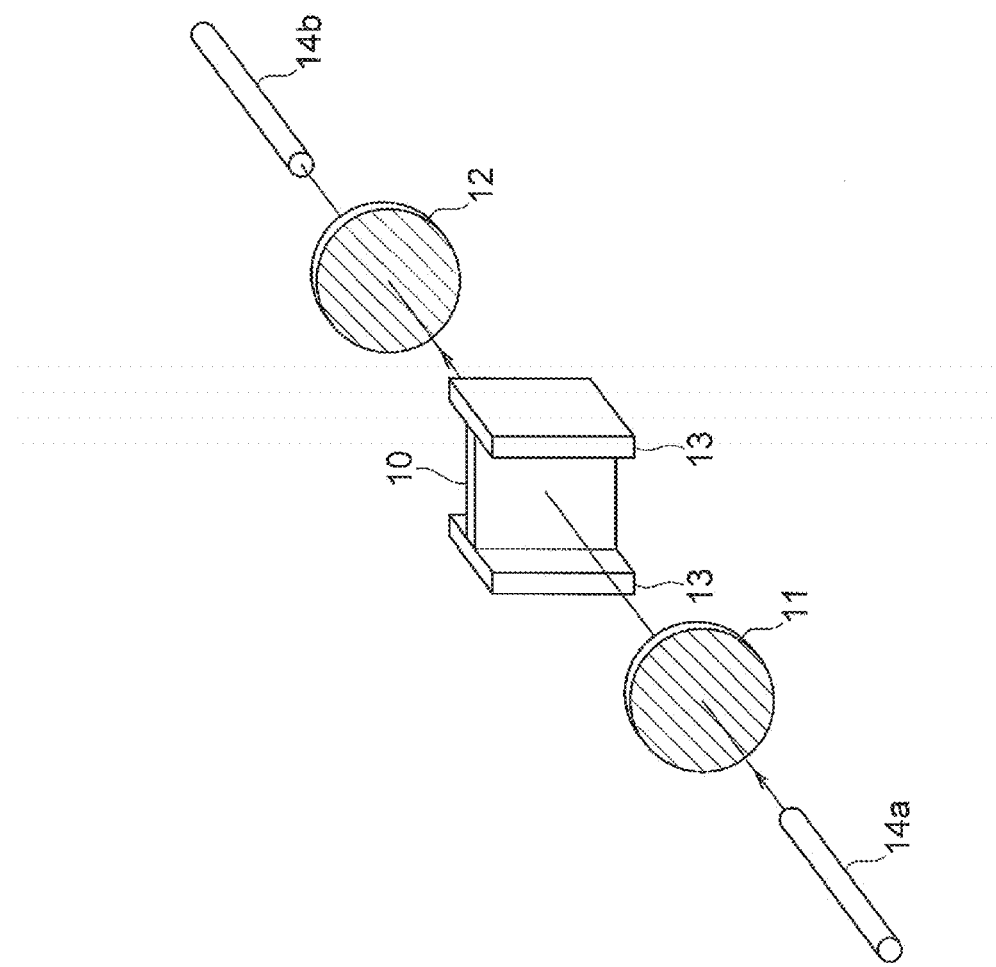
FIG. 14 represents a schematic configuration of a conventional optical isolator.

Since the aforementioned composite nanocrystal and composite thin film containing the Eu (II) compound generate great Faraday effects, they can be utilized as magnetooptical materials. For example, they may be applied to optical isolators or the like used for optical communication or the like to prevent optical feedback. FIG. 14 represents a schematic configuration of a conventional optical isolator. As shown in FIG. 14, in the structure of the optical isolator, a Faraday rotator 10 is placed between a polarizer 11 and an analyzer 12, and the Faraday rotator 10 is sandwiched between permanent magnets 13 applying a magnetic field. In the optical isolator, forward light introduced from an optical fiber 14a is linearly-polarized by a polarizer 11, then light with a polarization plane rotated by the Faraday rotator 10 is introduced to an optical fiber 14b through the analyzer 12. Meanwhile, backward light (optical feedback) is linearly-polarized by the analyzer 12, and its polarization plane is rotated by the Faraday rotator 10, but the polarization plane of light after rotation is in discord with the polarizer 11, thus light cannot pass through the polarizer 11, and the optical feedback is blocked there. As the Faraday rotator 10, one made from garnet crystal or the like has been conventionally used. Even when the Faraday rotator 10 is produced by using the nanocrystal or the thin film containing the Eu (II) compound, the same polarization rotation effect as the garnet crystal Faraday rotator 10 can be obtained. Hence, a household optical isolator for short-haul communication can be produced at a low price.

Although optical isolators now on the market correspond to only the near infrared region, the optical isolator equipped with the Faraday rotator 10 produced by using the aforementioned nanocrystal or thin film containing the Eu (II) compound corresponds to ultraviolet region as well as the visible region, and can also be used if multiwavelength communication is realized in the near future.

In addition, the aforementioned composite nanocrystal or composite thin film containing the Eu (II) compound can be utilized for optical switch based on magnetooptic effects. For example, it can be adopted as a Faraday rotator of an optical switch.

(Inorganic Glass Thin Film, Polymeric Thin Film)

In addition, a thin film having a novel property can be produced by adding the aforementioned composite nanocrystal containing the Eu (II) compound to an inorganic glass thin film and a polymeric thin film. For example, a solution containing the composite nanocrystal is rendered a colloidal solution by hydrolysis and condensation polymerization, furthermore enhanced reaction produces a gel without fluidity, and this gel is heat-treated to produce an inorganic glass thin film containing the composite nanocrystal. In addition, the polymeric thin film containing the composite nanocrystal can be produced, for example by dispersing the composite nanocrystal in a dissolved polymer, spraying it to a plate or the like and drying.

The aforementioned inorganic glass thin film and polymeric thin film may be utilized for various applications. For example, Kerr effect of the Eu (II) compound which rotates a polarization direction of a reflected light is utilized to produce a recording medium such as a magnetic optical disc writable and readable for data by using the nanocrystal containing the Eu (II) compound. For example, in the magnetic optical disc, while a magnetic field of which the strength does not so much as reverse the magnetization direction is applied on a recording surface made from a resin thin film containing the nanocrystal on the disc surface in an opposite direction of the magnetization direction, a temperature is raised by illuminating condensed laser light, so that the magnetization direction is reversed only in a part irradiated with the laser light, and data is written. In data reproduction, laser light weaker than the writing light is applied on the recording surface to detect difference in Kerr rotation angle of the reflected light by polar Kerr effects. That is, recorded signals can be read by detecting the difference in Kerr rotation angle as change in light intensity using a polarizer.

Consequently, a Faraday rotational coefficient can be optionally increased to obtain a waveband with reduced optical transmission loss. Thereby, an optical device which cannot be realized under the conventional technology can be provided, for example, an optical isolator for two wavelengths can be composed of one optical isolator.

EXAMPLES

Example 1

An EuS nanocrystal doped with Mn was produced by the manufacturing method shown in the embodiment.

Example 2

An EuS nanocrystal doped with Fe was produced by the manufacturing method shown in the embodiment.

Example 3

An EuS nanocrystal doped with Co was produced by the manufacturing method shown in the embodiment.

Comparative Example 1

An EuS nanocrystal and a MnS nanocrystal were produced by the manufacturing method shown in the embodiment, and a mixture of them was produced. A mixture ratio of EuS and MnS was 10:1.

Comparative Example 2

An EuS nanocrystal was produced by the manufacturing method shown in the embodiment.

(Evaluation of Magnetic Property)

Figure 15:
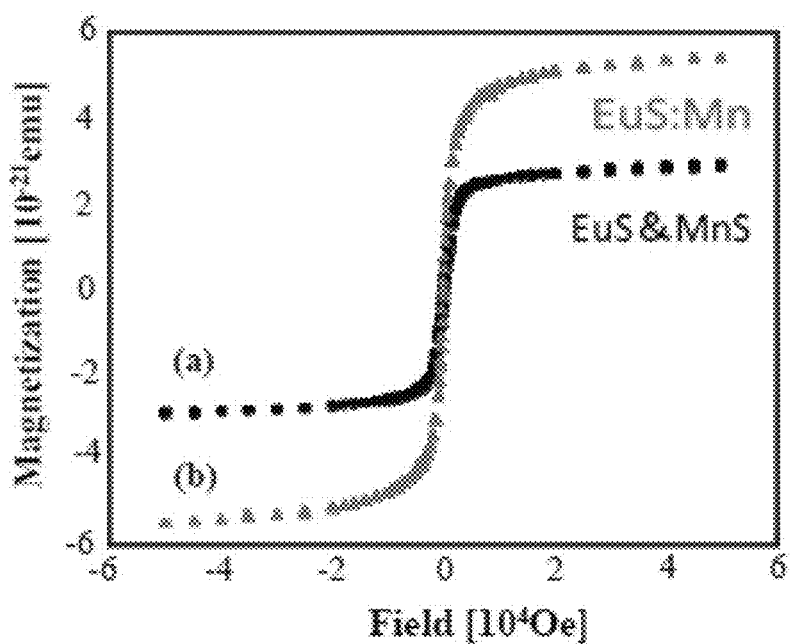
FIG. 15 represents measurement results of magnetic properties for the composite nanocrystal of the EuS nanocrystal and the Mn nanocrystal and for the EuS nanocrystal doped with Mn.

In example 1 and comparative example 1, an MH loop was measured. The measurement results are shown in FIG. 15. As shown in FIG. 15, in comparative example 1, the magnetic coercivity Hc was 20 Oe, and the saturated magnetization Ms was $2.89 \times 10^{-21}$ emu. Meanwhile, in Examples, the magnetic coercivity Hc was 24 Oe, and the saturated magnetization Ms was $5.44 \times 10^{-21}$ emu. Thus, when example 1 was compared with comparative example 1, its magnetic coercivity Hc was increased, but not significantly changed. On the other hand, the saturated magnetization Ms in example 1 was about 1.88 times higher than the saturated magnetization Ms in comparative example 1. The increased saturated magnetization is attributed to $Eu^{2+}$—$Mn^{2+}$ interaction. Consequently, improvement of the saturated magnetization was found, suggesting that Mn doping into EuS was effective in improving magnetic properties.

Figure 16:
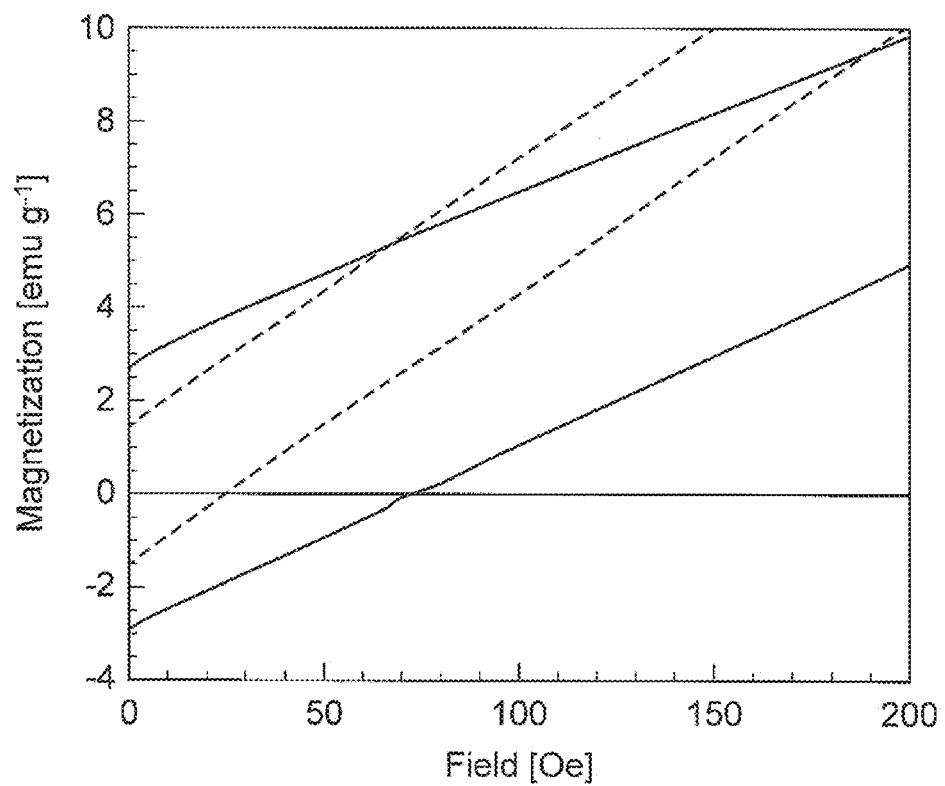
FIG. 16 represents measurement results of magnetic coercivities of the EuS nanocrystal and the EuS nanocrystal doped with Mn.

In examples 1 to 3 and comparative example 2, measurement at a low temperature (1.8 K) was carried out to examine the effects on improvement of the magnetic coercivity Hc in more detail. As measurement samples, those in examples 1 to 3 and comparative example 2 were used. FIG. 16 is a partially enlarged view of the MH loop. In FIG. 16, example 1 is represented by a dashed line, and comparative example 2 is represented by a continuous line. As shown in FIG. 16, the magnetic coercivity Hc of example 1 is 70Oe and is higher than the magnetic coercivity Hc (25Oe) of comparative example 2. Also, in examples 2 and 3, the magnetic coercivity Hc was similarly evaluated. Results are shown in Table 2.

TABLE 2

| Sample | Coercive force $H_c$ [Oe] |
|---|---|
| EuS | 25 |
| EuS:Mn | 70 |
| EuS:Co | 30 |
| EuS:Fe | 40 |

As shown in Table 2, the magnitude relationship of the magnetic coercivity Hc among individual nanocrystals was expressed in: Hc (EuS:Mn)>Hc (EuS:Fe)>Hc (EuS:Co)>Hc (EuS). It is assumed that the magnetic coercivity Hc was increased because the transition metal ions (Mn, Fe, Co) introduced into the crystal lattice inhibited rotation of magnetic moment of the Eu (II) ions. Thus, the improved magnetic coercivity indicated that doping into EuS with transition metal ions (Mn, Fe, Co) was effective in improvement of magnetic properties.

(Evaluation of Light Absorbance Property)

Figure 17:
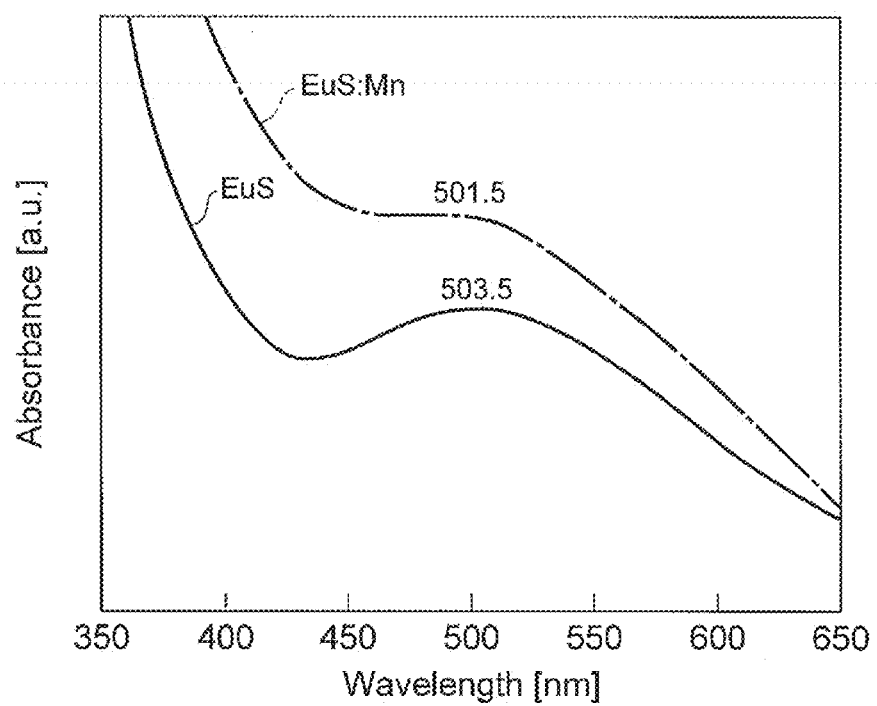
FIG. 17 represents measurement results of ultraviolet-visible absorption of the EuS nanocrystal and the EuS nanocrystal doped with Mn.
Figure 18:
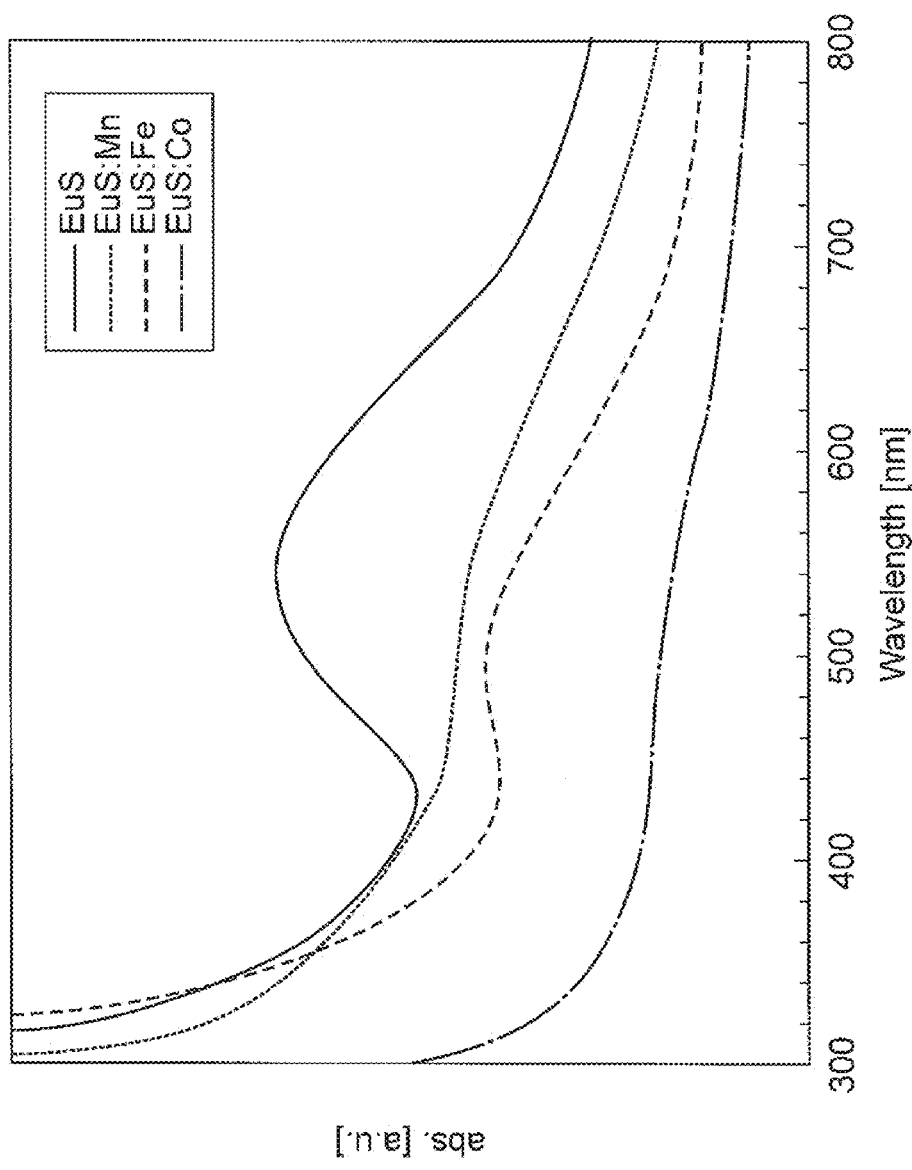
FIG. 18 represents measurement results of light absorbance of the EuS nanocrystal, the EuS nanocrystal doped with Mn, the EuS nanocrystal doped with Fe and the EuS nanocrystal doped with Co.

In examples 1 to 3 and comparative example 2, light absorbances were measured. First, for example 1 and comparative example 2, the crystals were dissolved in toluene to measure light absorbances in an ultraviolet-visible wavelength range. The measurement results are shown in FIG. 17. The horizontal axis represents wavelength, and the vertical axis represents absorbance abs in FIG. 17. As shown in FIG. 17, example 1 showed higher absorptive property than in comparative example 2 at 350 nm to 650 nm. That is, the absorption peak was observed to shift to the short wavelength side by doping with Mn. Next, for examples 1 to 3 and comparative example 2, the crystals were dissolved in toluene to measure light absorbances in a wavelength range of 300 nm to 800 nm. The measurement results are shown in FIG. 18. The horizontal axis represents wavelength, and the vertical axis represents absorbance abs. As shown in FIG. 18, the absorption peak was observed to shift to the short wavelength side by doping with the transition metal ions (Mn, Fe, Co). The detail of the absorption peak is shown in the following Table 3.

TABLE 3

| Sample | Wavelength [nm] |
|---|---|
| EuS | 540 |
| EuS:Mn | 520 |
| EuS:Co | 500 |
| EuS:Fe | 510 |

As shown in Table 3, examples 1 to 3 showed higher absorptive property than in comparative example 2.

(Evaluation of Magnetooptical Property)

In examples 1 and 2 and comparative example 2, a Verdet constant spectra were measured at room temperature. Generally, the Verdet constant V can be calculated by the following formula (1) using a rotation angle of linear polarization (Faraday angle) a, a magnetic field H, a sample thickness 1.

$$V = \frac{\alpha}{H \cdot l} \quad (1)$$

Here, when an absorption coefficient is ∈ and a sample concentration is c, a relationship between the sample thickness 1 and the absorbance abs is as shown in the following formula (2) (Lambert-Beer's law).

$$abs = \in \cdot c \cdot l \quad (2)$$

From Formula (1) and Formula (2), the Verdet constant V standardized by the absorbance abs is represented by the following formula (3).

$$V = \frac{\alpha}{H \cdot abs}[deg \cdot Oe^{-1} \cdot abs^{-1}] \quad (3)$$

In addition, in relation to Formula (3), the sample concentration c can also standardize the Verdet constant. Hence, the absorbance abs is initially measured, so that the Verdet constant can be evaluated without measuring the sample thickness 1 and the sample concentration c, by standardization using the measured absorbance abs.

Figure 19:
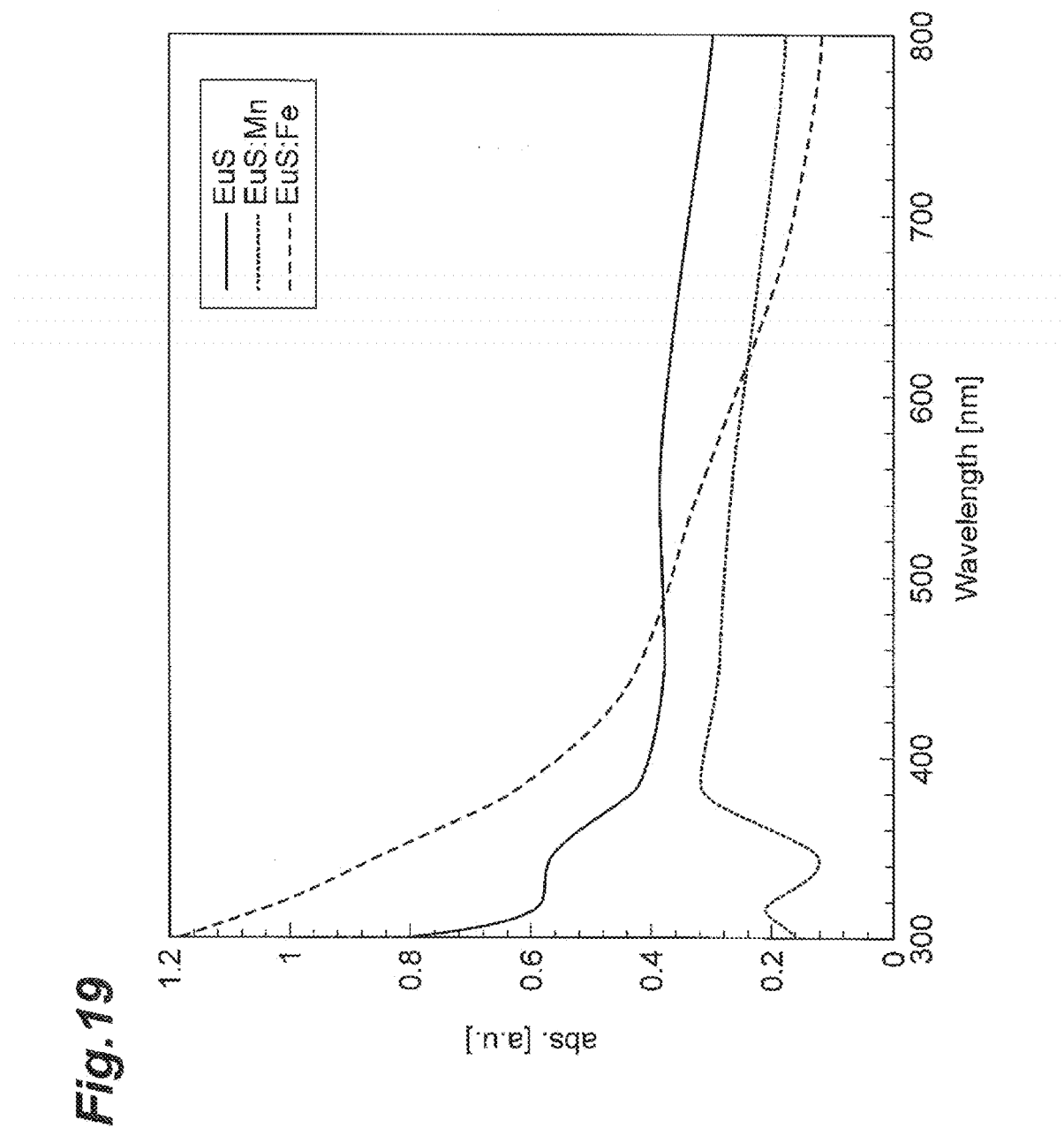
FIG. 19 represents measurement results of photoabsorption spectra of the EuS nanocrystal, the EuS nanocrystal doped with Mn, and the EuS nanocrystal doped with Fe.

For this reason, in examples 1 and 2 and comparable example 2, light absorbances at 300 nm to 800 nm were initially measured. In addition, an acrylic resin (PMMA: Poly (methyl methacrylate)) was dissolved in chloroform, each nanocrystal was dispersed in the PMMA-containing solution to produce a thin film by a casting method for measurement. Results are shown in FIG. 19. The horizontal axis represents wavelength, and the vertical axis represents absorbance abs in FIG. 19. Peak absorbances and wavelengths of individual samples are shown in Table 4.

TABLE 4

| Sample | Absorbance | Wavelength [nm] |
|---|---|---|
| EuS | 0.38438 | 540 |
| EuS:Mn | 0.27380 | 520 |
| EuS:Fe | 0.34038 | 530 |

Figure 20:
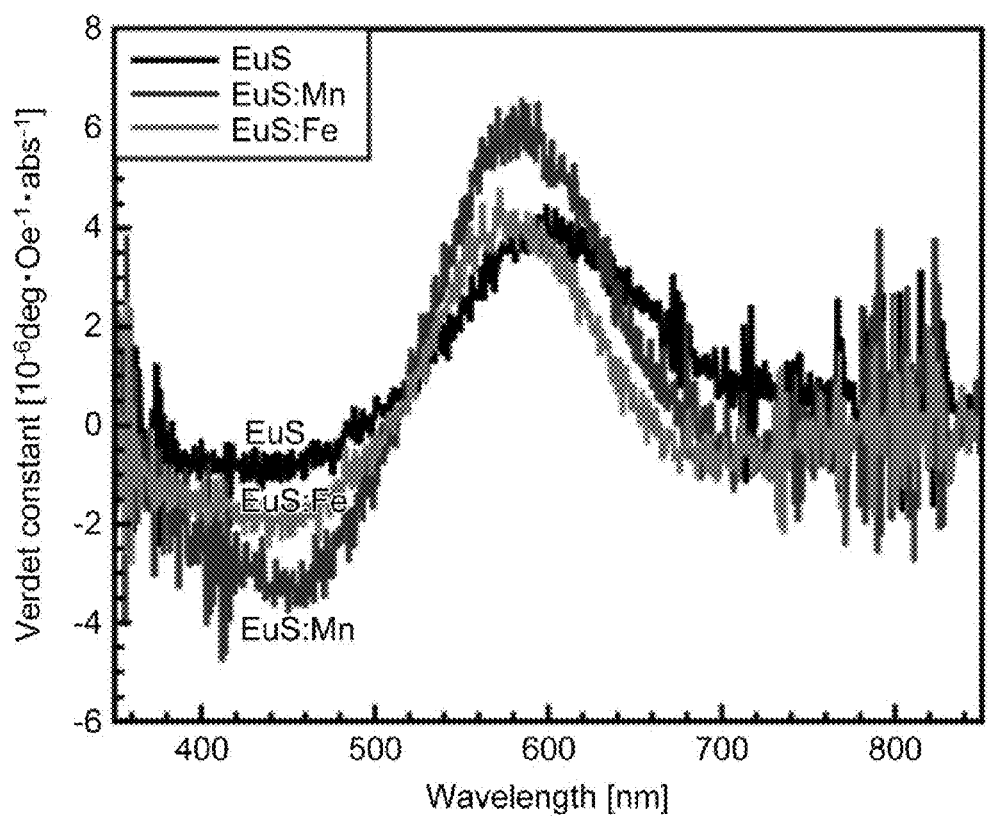
FIG. 20 represents Verdet constant spectrographies of the EuS nanocrystal, the EuS nanocrystal doped with Mn, and the EuS nanocrystal doped with Fe.

Measurement results of the Verdet constants standardized by the absorbance abs obtained from Table 4 and the applied magnetic field H are shown in FIG. 20. The horizontal axis represents wavelength, and the vertical axis represents the standardized Verdet constant $[degO^{e-1}abs^{-1}]$ in FIG. 20. The standardized Verdet constants and the corresponding wavelengths of individual samples are shown in Table 5.

TABLE 5

| Sample | $\lambda_{max}$ [nm] | Verdet constant $[10^{-6} \deg \cdot Oe^{-1} \cdot abs^{-1}]$ |
|---|---|---|
| EuS | 599 | 4.50 |
| EuS:Mn | 584 | 6.50 |
| EuS:Fe | 572 | 4.75 |

As shown in FIG. 20 and Table 5, also for magnetooptical property, examples 1 and 2 had more enhancing effects than in comparative example 2.

REFERENCE SIGNS LIST

10 ... Faraday rotator, 11 ... Polarizer, 12 ... Analyzer, 13 ... Permanent magnet, 14 ... Optical fiber, 15 ... Laser light source, 16 ... Dielectric mirror

The invention claimed is:

1. An EuS nanocrystal doped with ions of Mn, Fe or Co, which is coated with a film containing Mn, Fe or Co.

2. A magnetooptical material which is made by using the nanocrystal described in claim 1.

3. An inorganic glass thin film which comprises the nanocrystal described in claim 1.

4. A polymer thin film which comprises the nanocrystal described in claim 1.

5. An optical isolator with a Faraday rotator which is produced by using the nanocrystal described in claim 1.

6. An optical isolator with a Faraday rotator which is produced by using the magnetooptical material described in claim 2.

7. An optical isolator with a Faraday rotator which is produced by using the inorganic glass thin film described in claim 3.

8. An optical isolator with a Faraday rotator which is produced by using the inorganic glass thin film described in claim 4.

9. A manufacturing method of the nanocrystal, which comprises:
   a step of dispersing a complex containing Eu (III) and a complex containing Mn in a solvent, and
   a step of synthesizing an Eu (II) compound nanocrystal doped with the transition metal ions by thermal reduction of the solvent,
   wherein the complex containing Eu (III) is $Eu(PPh_4)(S_2CNEt_2)$, and the complex containing Mn is $Mn(S_2CNEt_2)_3$, and the Eu (II) compound is EuS.

10. A manufacturing method for electrochemically manufacturing a thin film, which comprises:
    a step of dispersing a complex containing Eu (III) and a complex containing a transition metal in a solvent, and
    a step of applying a voltage by inserting a transparent electrode as a work electrode into the solvent to produce the thin film composed of an Eu (II) compound doped with the transition metal ions on the transparent electrode,
    wherein the transition metal is Mn, Fe or Co, and the Eu (II) compound is EuS.

* * * * *